United States Patent
Nichols

(10) Patent No.: US 9,226,491 B2
(45) Date of Patent: *Jan. 5, 2016

(54) METHOD OF PROTECTING BUILDINGS FROM TERMITE ATTACK

(75) Inventor: Paul Ian Nichols, Constantine (GB)

(73) Assignee: PRESTIGE AIR-TECHNOLOGY LIMITED (GB)

( * ) Notice: Subject to any disclaimer, the term of this patent is extended or adjusted under 35 U.S.C. 154(b) by 599 days.

This patent is subject to a terminal disclaimer.

(21) Appl. No.: 13/420,765

(22) Filed: Mar. 15, 2012

(65) Prior Publication Data

US 2012/0222346 A1 Sep. 6, 2012

Related U.S. Application Data

(66) Continuation-in-part of application No. 12/094,517, Substitute for application No. PCT/GB2006/004309, filed on Nov. 17, 2006, now abandoned.

(51) Int. Cl.
*A01M 17/00* (2006.01)
*A01M 13/00* (2006.01)
*A01M 1/20* (2006.01)
*A01M 1/24* (2006.01)
(Continued)

(52) U.S. Cl.
CPC .............. *A01M 13/003* (2013.01); *A01M 1/026* (2013.01); *A01M 1/24* (2013.01); *A01M 1/245* (2013.01); *A01M 13/00* (2013.01); *A01M 17/00* (2013.01); *A01M 17/002* (2013.01); *E04B 1/72* (2013.01); *F24F 2003/1685* (2013.01); *F24F 2011/0004* (2013.01)

(58) Field of Classification Search
CPC ........... A01M 1/20; A01M 1/00; A01M 1/24; A01M 1/245; A01M 13/00; A01M 17/00; A01M 17/02; A01M 17/04; A01M 29/00; A01M 29/34; A01M 29/30
USPC .......................................... 43/132.1, 124, 125
See application file for complete search history.

(56) References Cited

U.S. PATENT DOCUMENTS 2,257,541 A * 9/1941 Smith .............................. 43/142
3,117,832 A * 1/1964 Thomas .......................... 422/23
(Continued)

FOREIGN PATENT DOCUMENTS

AU 74032-74 8/1976
EP 1570734 9/2005
(Continued)

*Primary Examiner* — Darren W Ark
(74) *Attorney, Agent, or Firm* — Fellers, Snider, Blankenship, Bailey & Tippens, P.C.

(57) ABSTRACT

The present invention relates to a method for protecting the lower regions of and structure of a building from damage or degradation by termites. The method comprising for the steps of creating a region in the ground below the building having properties hostile to termites whereby to discourage them from approaching the vicinity of the building. In one embodiment means for creating a hostile region in the ground below the building are provided by a pump which creates a superatmospheric pressure field in this region. In another embodiment, treatment agents such as ozone may be delivered to the ground region in order to provide a hostile effect to the termites by affecting their pheromone chemistry and/or their reproductive or communicative behavior. A secondary function of the present invention relates to the creation of a forced ventilation of the habitable region within which the apparatus of the present invention resides.

23 Claims, 6 Drawing Sheets

(51) Int. Cl.
  *E04B 1/72* (2006.01)
  *A01M 1/02* (2006.01)
  *F24F 3/16* (2006.01)
  *F24F 11/00* (2006.01)

(56) References Cited

U.S. PATENT DOCUMENTS

| | | | | |
|---|---|---|---|---|
| 3,294,480 | A * | 12/1966 | Potapenko | 422/120 |
| 3,322,623 | A * | 5/1967 | Doakley | 43/132.1 |
| 4,095,115 | A * | 6/1978 | Orr et al. | 422/186.07 |
| 4,182,663 | A * | 1/1980 | Vaseen | 422/23 |
| 4,625,474 | A * | 12/1986 | Peacock et al. | 43/124 |
| 4,805,341 | A * | 2/1989 | Maeda | 43/132.1 |
| 4,822,563 | A * | 4/1989 | Joslyn | 422/31 |
| 5,050,338 | A * | 9/1991 | Doakley et al. | 43/132.1 |
| 5,349,778 | A * | 9/1994 | Chu | 43/132.1 |
| 5,378,086 | A * | 1/1995 | Campbell et al. | 43/124 |
| 5,514,345 | A * | 5/1996 | Garbutt et al. | 422/124 |
| 5,566,627 | A * | 10/1996 | Pryor | 111/118 |
| 5,575,105 | A * | 11/1996 | Otomo | 43/132.1 |
| 5,592,774 | A * | 1/1997 | Galyon | 43/124 |
| 5,624,635 | A * | 4/1997 | Pryor | 422/32 |
| 5,788,930 | A * | 8/1998 | McMurray | 422/121 |
| 5,815,090 | A * | 9/1998 | Su | 43/132.1 |
| 5,877,422 | A * | 3/1999 | Otomo | 43/132.1 |
| 5,915,949 | A * | 6/1999 | Johnson | 43/124 |
| 5,983,834 | A * | 11/1999 | Tai | 119/448 |
| 6,052,066 | A * | 4/2000 | Su | 43/132.1 |
| 6,150,944 | A * | 11/2000 | Martin et al. | 43/124 |
| 6,223,464 | B1 | 5/2001 | Nekomoto et al. | 43/132.1 |
| 6,276,304 | B1 * | 8/2001 | Tai | 422/186.07 |
| 6,325,971 | B1 * | 12/2001 | Hayes | 422/32 |
| 6,327,812 | B1 * | 12/2001 | Hedman et al. | 43/132.1 |
| 6,349,888 | B1 * | 2/2002 | Au et al. | 239/208 |
| 6,468,433 | B1 * | 10/2002 | Tribelski | 422/22 |
| 6,581,324 | B1 * | 6/2003 | Creeger et al. | 43/132.1 |
| 6,596,232 | B1 * | 7/2003 | Lin et al. | 422/31 |
| 6,713,027 | B2 * | 3/2004 | McNulty, Jr. | 422/186.06 |
| 6,810,832 | B2 * | 11/2004 | Ford | 119/437 |
| 6,892,491 | B2 * | 5/2005 | Hedman | 43/132.1 |
| 6,893,610 | B1 * | 5/2005 | Barnes | 422/4 |
| 6,955,786 | B2 * | 10/2005 | Carman et al. | 422/33 |
| 7,036,269 | B1 * | 5/2006 | Chen et al. | 43/139 |
| 7,146,659 | B2 * | 12/2006 | Mattson et al. | 4/541.1 |
| 7,451,568 | B2 * | 11/2008 | Hoshall | 43/132.1 |
| 7,468,159 | B2 * | 12/2008 | Lin et al. | 422/33 |
| 7,690,148 | B2 * | 4/2010 | Hedman | 43/132.1 |
| 7,837,932 | B2 * | 11/2010 | Hedman | 43/132.1 |
| 8,620,478 | B2 * | 12/2013 | Nichols | 422/37 |
| 2001/0004813 | A1 * | 6/2001 | Hedman | 43/132.1 |
| 2002/0066223 | A1 * | 6/2002 | Hedman et al. | 43/124 |
| 2003/0152481 | A1 * | 8/2003 | Birnecker | 422/28 |
| 2003/0160699 | A1 * | 8/2003 | Trompen | 43/124 |
| 2003/0192230 | A1 * | 10/2003 | Hoshall | 43/124 |
| 2004/0028554 | A1 * | 2/2004 | Hedman | 422/24 |
| 2004/0028583 | A1 * | 2/2004 | Hedman | 422/292 |
| 2004/0067178 | A1 * | 4/2004 | Molleker | 422/186.07 |
| 2004/0103579 | A1 * | 6/2004 | Nolen et al. | 43/107 |
| 2005/0013727 | A1 * | 1/2005 | Hedman | 422/3 |
| 2005/0220662 | A1 * | 10/2005 | Hedman | 422/1 |
| 2005/0246942 | A1 * | 11/2005 | Mueller et al. | 43/124 |
| 2006/0017577 | A1 * | 1/2006 | Broussard | 43/132.1 |
| 2006/0042155 | A1 * | 3/2006 | Nolen | 43/107 |
| 2007/0084105 | A1 * | 4/2007 | Lindsay et al. | 43/132.1 |
| 2008/0014111 | A1 * | 1/2008 | Hedman | 422/3 |
| 2008/0031770 | A1 * | 2/2008 | Heselton et al. | 422/4 |
| 2008/0274012 | A1 * | 11/2008 | Cumberland et al. | 422/4 |
| 2009/0117016 | A1 * | 5/2009 | Decker et al. | 422/186.08 |
| 2009/0191091 | A1 * | 7/2009 | Danchenko et al. | 422/32 |
| 2009/0311134 | A1 * | 12/2009 | Iwashita et al. | 422/28 |
| 2010/0024280 | A1 * | 2/2010 | Reed et al. | 43/132.1 |
| 2010/0047116 | A1 * | 2/2010 | Garner | 422/4 |
| 2010/0298981 | A1 * | 11/2010 | Chamorro et al. | 700/276 |
| 2010/0300005 | A1 * | 12/2010 | Nichols | 52/1 |
| 2011/0008264 | A1 * | 1/2011 | Negishi et al. | 43/1 |
| 2013/0164385 | A1 * | 6/2013 | Shannon et al. | 43/129 |
| 2013/0276357 | A1 * | 10/2013 | Shannon et al. | 43/132.1 |
| 2013/0305589 | A1 * | 11/2013 | Nichols | 43/132.1 |

FOREIGN PATENT DOCUMENTS

| | | |
|---|---|---|
| FR | 2852201 | 9/2004 |
| GB | 834004 | 5/1960 |
| GB | 2373004 | 9/2002 |
| GB | 2432375 | 5/2007 |
| GB | 2454941 | 5/2009 |
| JP | 01091732 | 4/1989 |
| JP | 01304838 | 12/1989 |
| JP | 05170610 | 7/1993 |
| JP | 06327390 | 11/1994 |
| JP | 06327390 A * | 11/1994 |
| JP | 07008148 | 1/1995 |
| JP | 07059497 | 3/1995 |
| JP | 07213591 | 8/1995 |
| JP | 10070949 | 3/1998 |
| JP | 11036470 | 2/1999 |
| JP | 11036470 A * | 2/1999 |
| JP | 3071411 | 9/2000 |
| JP | 2001045957 | 2/2001 |
| JP | 2001258455 | 9/2001 |
| JP | 2001309744 | 11/2001 |
| JP | 2002058411 | 2/2002 |
| JP | 2002300840 | 10/2002 |
| JP | 2003010732 | 1/2003 |
| JP | 2003010732 A * | 1/2003 |
| JP | 2005176641 | 7/2005 |
| JP | 2005221131 | 8/2005 |
| JP | 2006055006 | 3/2006 |
| JP | 2006304638 | 11/2006 |
| WO | WO2005046743 | 5/2005 |

* cited by examiner

METHOD OF PROTECTING BUILDINGS FROM TERMITE ATTACK

CROSS REFERENCE TO RELATED APPLICATIONS

This application is a Continuation-in-Part of U.S. patent application Ser. No. 12/094,517 entitled "IMPROVED BUILDING PROTECTION APPARATUS," filed May 21, 2008, which is a U.S. National Entry of International Patent Application No. PCT/GB2006/004309, the contents of both of which are hereby incorporated by reference.

FIELD OF THE INVENTION

The present invention relates generally to a method for protecting the structure of a building from attack by termites.

BACKGROUND OF THE INVENTION

Existing pest control methods differ for new build and retrofit installations. For example, currently, in new build installations control is achieved by use of a passive barrier. Conversely, in retrofit installations the common control method involves the use of chemical treatment. Failure of performance may occur in both of these common methods currently used.

In the case of a passive barrier, for example of the type disclosed in U.S. Pat. No. 5,417,017, even a very small failure can effectively have the same result as having no barrier at all, since termites are able to pass through very small openings. Consequently, 100% performance of a control method of this type is difficult to achieve for a new build housing installation. An additional problem with this method of pest control is that damage to the barrier may occur during work being undertaken subsequent to the initial installation, such that later alterations may damage the integrity of an existing well-fitted barrier.

The treatment of existing buildings when infested with termites generally relies upon the delivery of a fumigating chemical and/or pesticide to the total area of the underside of a building, where access is difficult. Consequently, the effectiveness of this fumigation method is reliant upon the operative's efficiency. It is unlikely that 100% of the termites will be killed on every such treatment, leaving some in place to continue damaging the building, which means that a further treatment is required periodically, for example every three months, which is a labor intensive as well as a costly procedure, and more importantly the building is gradually damaged more and more by the termites which are not killed off at each treatment as their population builds up again.

Various systems have been tried to keep termites at bay to protect buildings. Japanese publication document 11-036470 (Kagawa) describes a system in which a treatment agent (ozone) is delivered as a fumigation treatment in to an already-infested building with the intention of killing the insects in place in the building by applying a concentration of treatment agents sufficiently high for this purpose and for relatively short duration since, while such serious and potentially harmful fumigation is taking place in the building it is wise, if not downright necessary, for the building to be evacuated of its human inhabitants. Kagawa describes a treatment effected by infusing ozone for something in the region of two hours until the termites are killed.

U.S. Pat. No. 6,327,812 (Hedman) also relates to a fumigation treatment of up to six hours. In such fumigation treatments it is not possible to allow human habitation to continue.

Another Japanese patent 6-3273902 (Miwazawa) involves utilizing a detector to sense the migration of termites in order to trigger the infusion of the treatment agent sufficient to kill the termites. This treatment is applied once the termites are in the building, and the aim of the treatment is to kill the termites entirely, although as discussed above, it has to be recognized that such total eradication is rarely actually achieved in practice.

An alternative approach is utilized in other circumstances, where it is known to utilize long term low level infusion of ozone, for example as described in U.S. Pat. No. 5,514,343 (Garbut), which keeps molds and bacteria at bay in animal housing. Similarly, U.S. Pat. No. 6,325,971 (Hayes) describes a system for distributing ozone throughout a poultry house, including the step of infusing a litter bed with ozone. The ozone is maintained at exposure levels lethal to pathogens within the litter bed indefinitely. The Garbut document describes the use of ozone in enclosed spaces, primarily fruit storage rooms or animal housing, with ozone being used to lethal effect on bacteria, fungus and molds. The document also refers to the maintenance of a residual amount of ozone sufficient continuously to suppress the bacteria, fungus and molds whilst being safe for human exposure to allow workers to move in and out of the ozonated area without hazard.

U.S. Pat. No. 6,276,304 (Tai) refers to the introduction of ozone beneath the ground, namely into the material within a manure pit beneath ground level constituting part of the interior of a pig raising house.

Although it is recognized in these documents that a low level of ozone may achieve the desired lethal effect while nevertheless being sufficiently low in concentration in the regions occupied by humans as to cause no damage to the humans, this system cannot be applied directly to the protection of buildings from termites as will be discussed in more detail below.

The performance of the delivery system therefore is the key to achieving effective control of termites. It has been found that in order to preserve the integrity of a building it is necessary to infuse the ground with a concentration of treatment agent which is sufficient to create a hostile environment without actually killing any termites. As a consequence the termites are unable to remain in the hostile environment and move away from it. Importantly, as they leave, they secrete a warning pheromone which acts as a deterrent to other termites, discouraging them from entering the protected region while it remains active. It is therefore not necessary to infuse the treatment agent into the protected region while their pheromone is active. Indeed, it has also been found that continuous, uninterrupted delivery of treatment agent such as ozone may even be counterproductive because it can mask the termites' own warning pheromone, and termites can get inured to the presence of the treatment agent and develop tactics to cope with its presence. One technique which has been observed is for termites to create tunnels from regurgitated cellulose obtained from wooden parts of the building's structure. The cellulose tunnels are impervious to ozone so that the termites are effectively screened from it and can consequently bore further into the timber weakening the structure despite the attempts to eradicate them. A prophylactic treatment thus requires a careful determination of the best concentration of treatment agent such as to cause the termites to vacate the protected region, rather than flooding the area and causing death without giving the insects an opportunity to escape since it is only upon escaping that they secrete their warning pheromone that is developed by the termites themselves to stick to the surfaces of their passageways and tunnels and warn other termites not to enter the protected region.

SUMMARY OF THE INVENTION

Accordingly, the present invention provides a method of protecting a building from damage by termites, comprising the steps of:
  detecting the presence of termites within the building or the close vicinity thereof,
  infusing a protected region of the ground below the building with ozone by delivering ozone into the said protected region at a determined concentration which is both less than that at which its presence would cause detrimental effects on humans occupying the building, and sufficient to cause the termites to vacate the protected region,
  detecting the departure of the termites from the said protected region and discontinuing the delivery of ozone, thereafter maintaining the ozone delivery turned off and allowing termites to return to the protected region,
  monitoring the protected region for the presence of termites, and after they have returned into the protected region recommencing the delivery of ozone at the said determined concentration until the termites again vacate the said protected region,
  repeating the said monitoring and delivering steps for as long as the monitoring step discloses the return of termites into the said protected region.

The present invention also comprehends a method of protecting a building from damage by termites, comprising the steps of:
  detecting the presence of termites within the building or within close proximity thereof,
  infusing a protected region of ground between the building with ozone by delivering ozone into said protected region at a determined concentration which is less than that at which its presence would cause harmful effects on humans occupying the building and sufficient to cause the termites to vacate the protected region,
  detecting the absence of termites in said protected region,
  discontinuing the delivery of ozone to said protected region,
  monitoring the protected region to detect the return of termites thereto, and determining the time elapsed since delivery of ozone was discontinued,
  recommencing delivery of ozone at the said determined concentration until the termites again vacate the said protected region, and
  repeating the periodic delivery of ozone at intervals and for time periods determined by the said detection of the presence and absence of the termites.

DETAILED DESCRIPTION OF THE PREFERRED EMBODIMENTS

Figure 1:
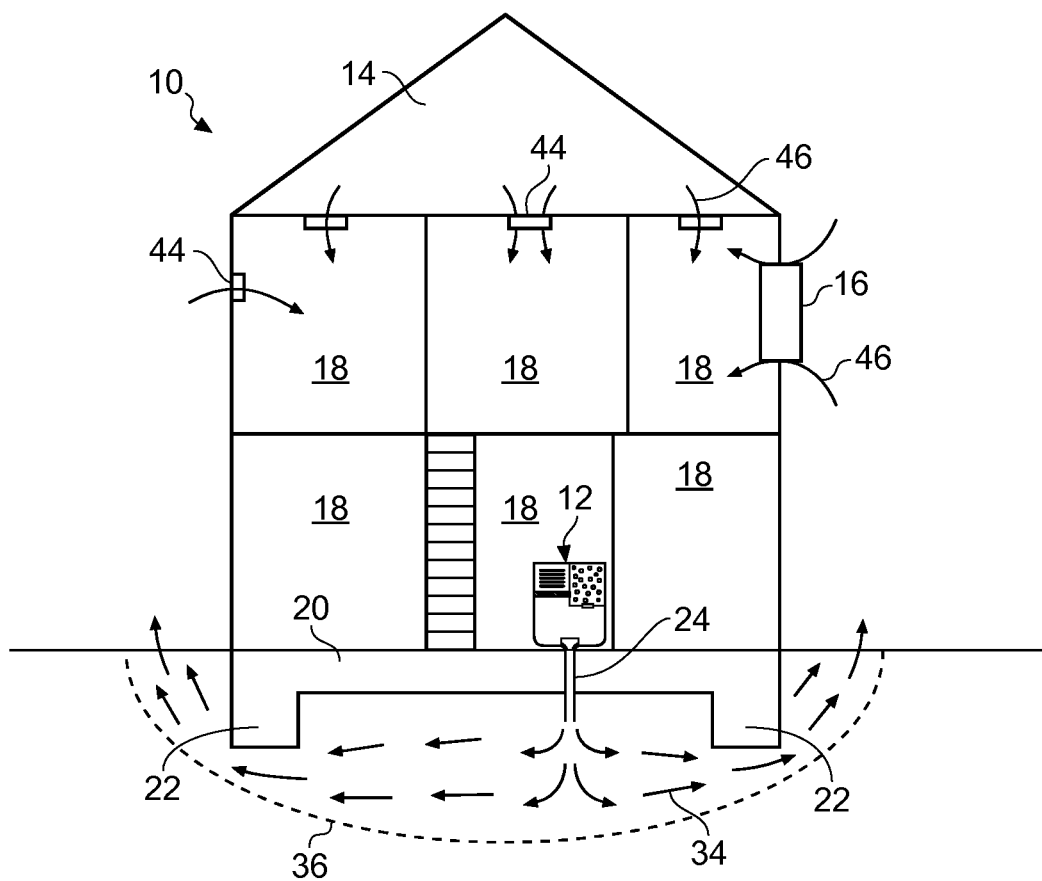
FIG. 1 is a cross section of a building to which an embodiment of the present invention has been applied.

The means for creating a region with properties inhospitable to the termites comprise means for delivering ozone at least in sufficient concentration to affect the reproductive or communicative behavior of said termites or other insects, in other words it is not sufficiently concentrated as to be lethal, but it causes termites to attempt to communicate by secreting warning pheromones as they leave the region.

The ozone is thus to be delivered at least in sufficient concentration to modify the pheromone chemistry of the termites.

The apparatus used for performing the method of the invention may further comprise means for generating a superatmospheric pressure field in the ground region below the building. A positive pressure field in this region will help to ensure that the termites are repelled from this field and therefore are discouraged from approaching the protected region.

The means for creating a superatmospheric pressure field may comprise a pump located within the building. Such a pump may provide sufficient pressure to create a superatmospheric pressure field in the region below the building.

The pump may be located within a habitable region of the building and may act to create forced ventilation thereof. By pumping air from the habitable region of the building to a region below the building, this creates a pressure differential between the two regions. The resultant sub-atmospheric pressure field created in the habitable region of the building encourages an inward movement of air from the exterior of the building thereby naturally ventilating the interior of the building. Further, because the pump is located within a habitable region of the building, access to the pump is made easier for the purpose of any repair and maintenance work that may be required.

The apparatus for performing the method of the invention may further comprise detecting means for monitoring the movement of termites as they approach the building from within the ground region below the building. The detecting means may be capable of communication with the means for delivery of the treatment agent into the region below the building, to allow the treatment agent to be delivered when required in response to the arrival of the termites. In this way, the treatment agent can be delivered to the protected region below the building In such a way as to maximize its effectiveness and moreover to trigger the termites themselves to generate a warning signal of long duration to keep other termites from approaching the building for a significant time period.

The apparatus may further comprise additional components to alter the form and/or potency of the treatment agent to be delivered. This may include, for example, means for ionizing air, for generating ozone or for generating oxides of nitrogen. Accordingly, the apparatus comprising the aforementioned means may act to ionize the air which passes through the apparatus. Further, the aforementioned means may also act to generate ozone and/or generate oxides of nitrogen from the air that passes through the apparatus. The ozone may be generated on site (i.e., in situ) or may be generated off site and stored in containers on site ready for delivery to the region below a building, whereby to produce an environment inhospitable to termites.

The method of the invention may further comprise the step of detecting the arrival or presence of termites below the building and in response using this information to initiate the delivery of the treatment agent. If the treatment agent is ozone the appropriate delivery rate to achieve the required concentration levels at the places where the termites are found can be determined in advance from tests conducted on the site, or may be conducted from tables drawn up as a result of previous tests on similar such buildings or under laboratory conditions so that when implementing the method of the invention further such tests are not required.

The delivery of the treatment agent to the region below the building may be continuous for a short time, sufficient to drive out all the termites, or may be continued until all the termites have vacated the protected region and no further termites are detected as being present. A controlled ventilation at a pre-set flow rate may also prevent wood decay in the lower regions of the buildings simply by improving the ventilation. The creation of an airflow at depth flooding through the ground under a building will produce a totally unnatural subsoil condition for termites, thereby acting as an invisible barrier. The effect will also be to remove track scenting, laid by such termites in their search for food and moisture; this will act as a disorientating and hostile environment to them. It is important therefore, that the delivery of treatment agent be discontinued once the termites have vacated the protected region, in order to avoid dissipating their warning pheromones, which would result in an earlier reinfestation.

The treatment agent may then be delivered at temporally spaced intervals. In this way the present invention may also be used as a backup insurance to a permanent passive barrier. The present invention may therefore remain in a dormant state until such a passive barrier has been breached. Accordingly, the treatment agent may then be delivered to the subterranean regions in the required amounts. The required amount may of course change over time depending on the nature of the ground and possibly the species of termites and therefore the temporally spaced intervals of the treatment agent delivery may also be varied to accommodate this change.

The delivery of the treatment agent may also additionally be randomly altered in terms of the concentration of the treatment agent or the length of the temporally spaced intervals. In this way, the termites are less likely to become resistant or tolerant to the arrangement of the irregular delivery of treatment agent, whether this be the concentration or the temporal intervals between the treatment agent applications.

In a further aspect, the present invention also envisages a method of protecting a subterranean region below a building from insects, such as termites, the method comprising the step of creating an environment having properties inhospitable to the said termites or other insects by the presence of ozone, the said ozone being present at least in sufficient concentration to cause said termites to vacate the region whereby to result in at least a depletion of the population thereof In another aspect of the present invention, there is provided a method of protecting a subterranean region below a building from termites, the method comprising the step of creating an environment having properties inhospitable to the said termites or other insects by the presence of ozone, the said ozone being present at least in sufficient concentration to cause the termites to vacate the vicinity and to leave the pheromone warning signal to deter other termites from entering the region.

In a further aspect, the present invention encompasses the use of ozone to protect a subterranean region below a building from insects, such as termites, whereby to produce an environment inhospitable to the said termites without being lethal when present at least in sufficient concentration to affect the reproductive or communicative behavior of the said termites or other insects.

In another aspect, the present invention provides for the use of ozone in the manufacture of a composition for the treatment of a subterranean region below a building against infestation by insects, such as termites.

A pheromone is a volatile hormone or behavior-modifying agent. Ozone is a known, strongly oxidizing agent. Accordingly, it is believed that ozone may be used to modify the behavior of a termite, causing it to produce a pheromone, such that the communication between termites for example, is affected. This may, for example, have a disorientating effect on the termites.

Accordingly, ozone may have an alternative use for affecting the reproductive or communicative behavior, and/or modifying the pheromone chemistry of insects, such as termites.

Apparatus formed according to the present invention may comprise means for generating ozone in situ or on site, which may then be conveyed to the required regions. A method of producing ozone on site may include for example, reacting hydrocarbons with nitrogen oxides, particularly nitrogen dioxide, in the presence of sunlight or other source of ultraviolet light. This method is similar to the natural creation of ground level ozone. Other methods of generating ozone on site may include electrostatic or corona discharge techniques.

In use of an embodiment of the present invention, air comprising ozone is injected into a region below a building infested with termites or other insects. The ozone has the effect of creating an uncomfortable and hostile environment for the termites or other insects, and further is able to modify the pheromone chemistry thereof, thereby inhibiting the communication between the termites or other insects, which has the effect of disorientating them. Accordingly, such termites or other insects may either be reduced in numbers by evacuation or termination, or may simply be discouraged from approaching the building.

Insects, such as termites, feed on wood or other sources of cellulose. Although they lack specific cellulases for breaking down cellulose they are still able to digest it because of symbiotic relationships with flagellate protozoa, bacteria and fungi. For example, some protozoa digest wood particles by hydrolyzing cellulose anaerobically, which produces glucose that can be absorbed by an insect, such as a termite.

The cellulose which insects, such as termites, attack is broken down to carbon dioxide and water, causing timber to lose strength. The resultant increase in concentration of carbon dioxide during digestion of wood by termites, for example, provides an attractant scent indicating the presence of food for other termites. It is thought that the presence of ozone may reduce or eliminate the carbon dioxide residing in the environment of the termite or other insects, thereby affecting the pheromone chemistry of the termites or other insects. The ozone may provide an energized oxygen-rich atmosphere which may be inhospitable to termites or other insects.

To ensure that the ozone concentration does not have adverse effects on human health if the ozone were to escape from subterranean region below the building into the building itself, the concentration of the ozone in the air to be injected is preferably less than 0.1 ppm (parts per million). If a building is already infested with termites, then it may be desirable to inject a higher ozone concentration (higher than 0.1 ppm) for a short period to begin with, to increase the potency of the ozone/air mix, then reduce to a lower ozone concentration (lower than 0.1 ppm), which may be pumped continuously for an extended period, such as between a week and a month because it is below the safety threshold for humans. Alternatively, in houses under construction, it may be advantageous to inject a low ozone concentration (lower than 0.1 ppm) continuously during construction, for a preventative effect.

Referring first to FIG. 1, there is shown a section of a building, generally indicated 10. The building 10 comprises a loft region 14, a window 16, habitable rooms 18, a foundation layer 20, footings 22, a pump unit 12, and diffusion means (here depicted as a conduit 24). The pump unit 12 is located within a habitable room 18 and is shown in more detail in FIGS. 2a and 2b.

Figure 2A:
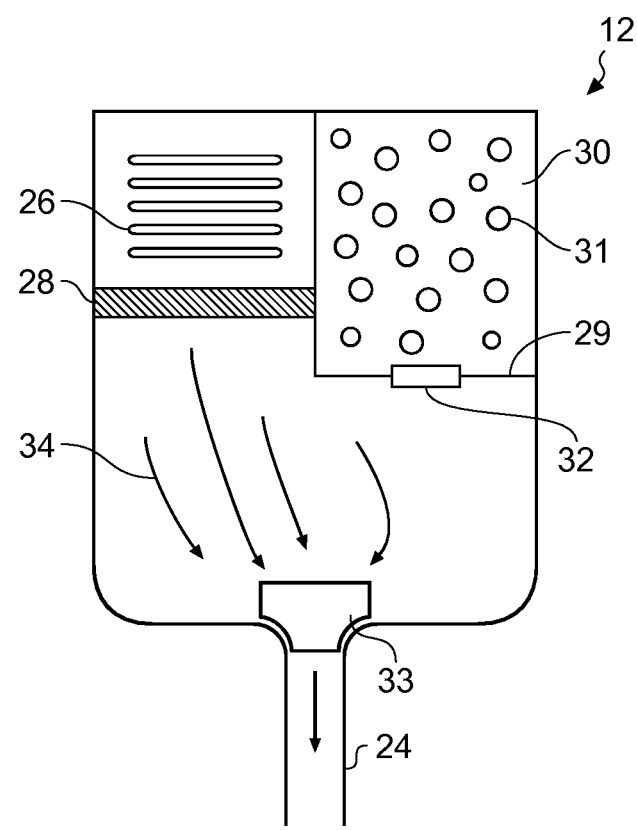
FIG. 2a is an enlarged view of the pump unit of FIG. 1 shown with the control valve in a closed position.

With reference to FIG. 2a, there is shown an enlarged view of the pump unit, generally indicated 12, of FIG. 1. The pump unit 12 has air intake openings 26, an air filter 28, a reservoir 30 of a chemical agent vapor 31 which comprises ozone in this example, and a control valve 32. Obviously, other types of closure valve may be employed in other embodiments. The pump unit 12 also has a primary mover 33 which, in use, draws air from within a habitable room 18 of the building 10 via the air intake openings 26. The pump unit 12 is provided with an air filter 28 to remove any dust particles or other impurities that may be contained within the air. Following this, the clean air moves in a direction indicated by the pump air stream arrows 34 towards the conduit 24, which is connected at the outlet of the pump unit 12. The control valve 32 is located within a wall 29 of the reservoir 30.

The amount of ozone 31 to be delivered to the subterranean ground region below the building 10 while the system is active can be varied by controlling the opening of the control valve 32. FIG. 2a illustrates the control valve 32 in a fully closed position, thereby preventing any chemical agent vapor 31 from mixing with and being conveyed by the air stream 34. Consequently, in this configuration the pump air stream 34 will not contain ozone 31 and, therefore, only air will be delivered to the subterranean regions below the building 10.

Figure 2B:
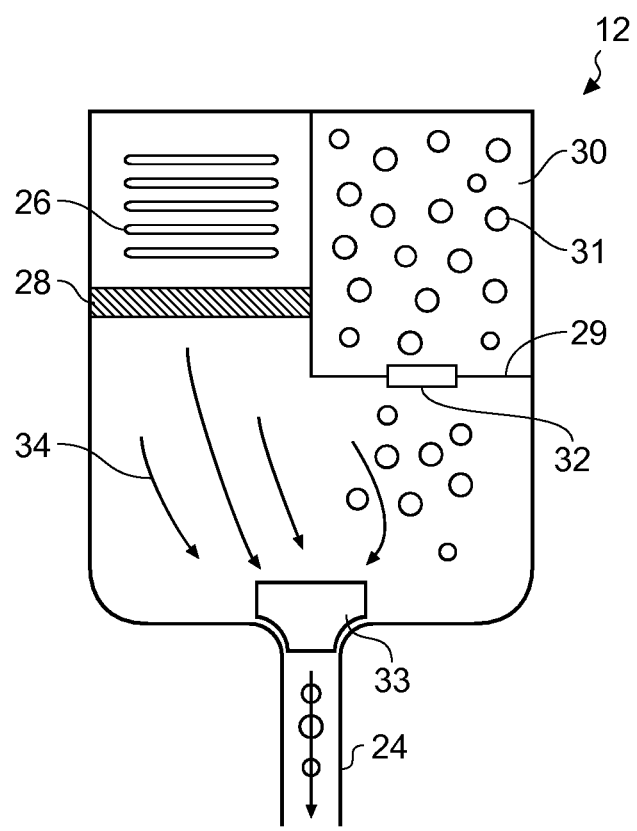
FIG. 2b is an enlarged view of the pump unit of FIG. 1 shown with the control valve in an open position.

FIG. 2b illustrates the pump unit 12 of FIG. 1, wherein the control valve 32 is in an open position. When in this configuration, the ozone 31 is free to mix with and be conveyed by the pump air stream 34 towards the adjoining conduit 24. In this way, an air/ozone mix (hereinafter referred to as the gas mix) can be delivered to the subterranean regions below the building 10. The amount of chemical agent vapor 31 to be delivered to the subterranean region below the building 10 can, therefore, be varied by adjusting the control valve 32 between the closed and open configurations shown in FIGS. 2a and 2b, respectively.

Referring back to FIG. 1, the conduit 24 connects the outlet from the pump unit 12 into the subterranean region below the building 10. The conduit 24 passes through the foundation layer 20 to enable delivery of the gas mix to the subterranean region below the building 10. The gas mix diffuses into the subterranean region below the building 10 and moves in a direction indicated by the arrows 34. This movement is in a downward and lateral direction from the ground region between the footings 22 of the building 10, to an eventual upward direction towards and through the ground layer located on the extremities of the building 10. In this way, the gas mix will eventually diffuse into the external atmosphere. The gas mix is forced into the ground region under pressure by the pump unit 12, thereby creating an invisible barrier 36 which acts to inhibit the presence of and growth of termites in order to protect the building 10.

Figure 3:
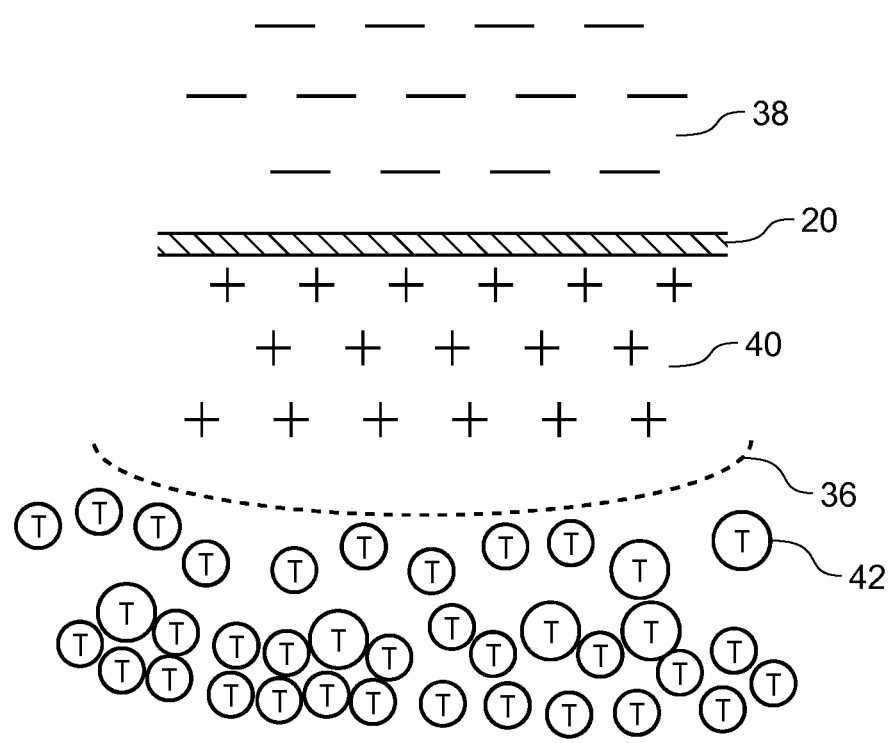
FIG. 3 is a section on an enlarged scale through the foundation layer of the building of FIG. 1.

With reference to FIG. 3, there is illustrated a representation of the respective regions above and below the foundation layer 20. The pump unit 12 pumps air from within the habitable rooms 18 of the building 10 into the ground region below the building 10. Accordingly, the relative pressures in these respective regions are indicated, in that the region above the foundation layer 20 has a sub-atmospheric pressure 38, whereas the region below the foundation layer 20 has a super-atmposheric pressure 40. This relative pressure differential ensures that a positive pressure field is maintained in the ground region below the building 10 when the system is active, thereby maintaining a continuous flow of gas mix within this region. This pressure differential and airflow has the effect of removing moisture from this region by ventilation thereof and also acts to avoid still air. Consequently, unnatural subsoil conditions are generated thereby creating an invisible barrier in which termites 42, are discouraged from entering. Accordingly, the termites 42 vacate the region, leaving behind a pheromone which warns other termites against entering the protected region.

Referring back to FIG. 1, there is also illustrated a secondary function of the present invention. The building 10 is also provided with external air intake grilles 44, through which external air surrounding the building 10 is drawn into the building. The external air intake grilles 44 are located on both the exterior side wall of the building 10 and on the ceilings of the habitable rooms 18 adjacent to the loft 14. The secondary function of the present invention takes effect in conjunction with the primary function of the present invention, in that in use when internal air is drawn in by the pump unit 12 to be delivered to the subterranean region below the building 10, external air is simultaneously drawn in from the external regions surrounding the building 10 and also the loft 14 of the building 10, the external air intake flow being indicated by arrows 46. This forced ventilation of the internal regions of the building 10 is caused by the sub-atmospheric pressure created by action of the pump unit 12. Accordingly, this induced pressure differential between the internal regions of the building 10 and the external regions of the building 10 causes external air to be drawn in via the external air intake grilles 44 and the peripheral regions of the window 16.

Figure 4:
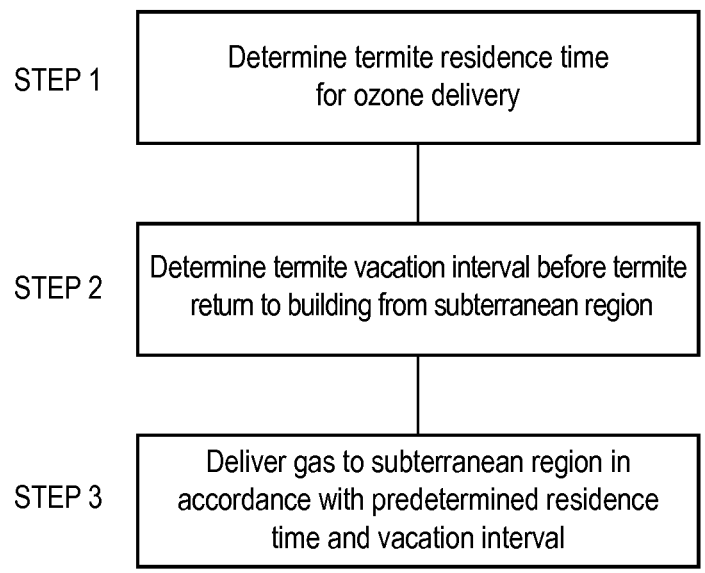
FIG. 4 is a flow chart showing the major steps in protecting a building from termites by the method of the present invention.

FIG. 4 is a flow chart showing the principal steps in protecting a building from termites. The first step comprises determination of the termite residence time period for delivery of ozone to inhibit the presence of the termites. This determination may be made by conducting field or laboratory testing in order to evaluate the effect of ozone on termites. At present, it is considered that ozone is the most suitable agent. The second step is the determination of the termite vacation interval before arrival of termites back at a building since plainly there is no incentive to infuse a building or the ground beneath it with a treatment agent if this is to be wasted. Sensors positioned in preset locations are able to monitor the progress of termites as they approach the building or an. The third step involves the use of a pump unit to deliver air/ozone mix to the subterranean regions below the building, thereby creating a superatmospheric pressure in this region. The delivery of the gas mix will be made in accordance with the previously determined residence time and vacation times of the termites. Because the delivery of the gas mix is made only when the termites are present in the building, then the amount of gas mix used is minimized, but more importantly, the termites themselves emit a pheromone as they leave the building, which acts as a warning to other colonies of termites as they approach, thus serving to keep them away from the building. Eventually, the effect of this pheromone will fade, at which point termites will again start to colonize the building. The sensors are adapted to detect when this has occurred and to recommence infusion of the treatment agent. Once the cycle time has been established, the sensors will no longer be needed and the periodic infusion of treatment agent can be made indefinitely thereby protecting the building from attack.

Figure 5:
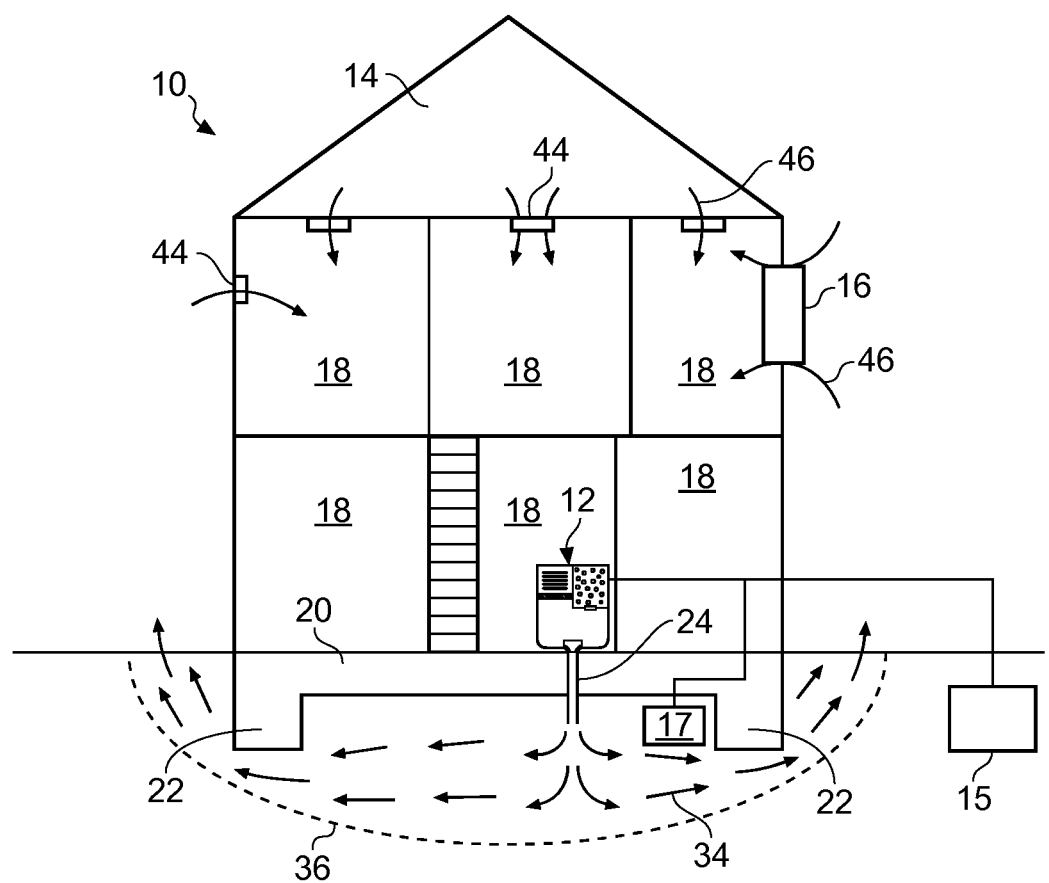
FIG. 5 is a cross section of a building equipped with an alternative embodiment of the invention.

In the alternative embodiment, illustrated in FIG. 5, sensors 15, 17 detect the presence of termites to trigger the operation of the pump to deliver ozone for the termite residence time and the termite vacation time.

Thus, the present invention is well adapted to carry out the objectives and attain the ends and advantages mentioned above as well as those inherent therein. While presently preferred embodiments have been described for purposes of this disclosure, numerous changes and modifications will be apparent to those of ordinary skill in the art. Such changes and modifications are encompassed within the spirit of this invention as defined by the claims.

What is claimed is:

1. A method of protecting a building from damage by termites, comprising the steps of:
    infusing, for a first predetermined period of time, a protected region of ground below the building with ozone by delivering the ozone into said protected region at a determined concentration of up to 0.1 ppm which is less than that at which its presence would cause harmful effects on humans occupying the building and sufficient to cause termites that may be present to vacate said protected region,
    discontinuing the delivery of ozone to said protected region after the first predetermined period of time for a second predetermined period of time,
    recommencing, for a third predetermined period of time, delivery of ozone at said determined concentration after the second predetermined period of time, and
    repeating the steps of delivering and discontinuing delivery of of ozone wherein the said first, second and third predetermined periods of time are of respective irregular durations, whereby to reduce the likelihood of termites becoming resistant or tolerant to the arrangement of the delivery of the ozone.

2. The method of claim 1, further comprising the steps of determining a vacation interval, being an elapsed time between departure of the termites and the return thereof, and a residence time, being the time between the commencement of ozone delivery and departure of the termites, are repeated for several iterations to determine an average value for said vacation interval and said residence time whereby to determine the points in time for commencement and cessation of ozone delivery to said protected region.

3. A method of protecting a building from damage, by termites, comprising the steps of:
    infusing a protected region of the ground below the building with ozone by delivering ozone into said protected region, for a first predetermined period of time at a determined concentration of up to 0.1 ppm, which is both less than that at which its presence would cause detrimental effects on humans occupying the building, and sufficient to cause termites that may be present to vacate the protected region,
    discontinuing the delivery of ozone after the first predetermined period of time and, thereafter, maintaining the ozone delivery turned off for a second predetermined period of time;
    recommencing the delivery of ozone at said determined concentration after the second predetermined period of time for a third predetermined period of time;
    repeating said delivering and discontinuing steps, wherein said first, second and third predetermined periods of time are of respective irregular durations, whereby to reduce the likelihood of termites becoming resistant or tolerant to the arrangement of the delivery of the ozone.

4. The method of claim 3, wherein the ozone is delivered at a rate such as to create a superatmospheric pressure field in said protected ground region below the building.

5. The method of claim 3 wherein the ozone concentration is varied below the safe level thereof whereby to avoid habituation of said termites to its presence.

6. The method of claim 3, wherein a termite residence time during which the termites remain in the building after the commencement of ozone delivery and before they vacate the building, is determined in advance by tests on said building or a comparable building.

7. The method of claim 3, wherein a termite residence time during which the termites remain in the building after the commencement of ozone delivery and before they vacate the building, is determined in advance by tests in a controlled environment.

8. The method of claim 3, wherein a termite vacation interval during which termites remain away from the building before returning thereto is determined in advance by tests on said building or a comparable building.

9. The method of claim 3, wherein a termite vacation interval during which termites remain away from the building before returning thereto is determined in advance by tests on a controlled environment.

10. A method of protecting a building from damage by termites, comprising the steps of:
    preparing an introduction pathway for delivering ozone to a ground region below the building,
    infusing said ground region with ozone by delivering ozone to said introduction pathway into said region at a rate and at a concentration of up to 0.1 ppm which is likely to result in an ozone concentration in habitable parts of the building which is less than that at which its presence would cause harmful effects on humans occupying said habitable parts of the building and sufficient to cause termites to vacate the building,
    continuing said ozone delivery for a first time period greater than that likely to result in substantially complete vacation of the building and said ground region by termites,
    thereafter discontinuing said ozone delivery for a second time period greater than that likely to be taken by termites to reinfest said building, then
    recommencing said delivery of ozone into said introduction pathway and repeating said infusing and discontinuing steps indefinitely wherein said first and second periods of time are of respective irregular durations, whereby to reduce the likelihood of termites becoming resistant or tolerant to the arrangement of the delivery of the ozone.

11. The method of claim 10, wherein the ozone is delivered at a rate such as to create a superatmospheric pressure field in said ground region below the building.

12. The method of claim 10 wherein the ozone concentration is varied below said safety threshold level thereof whereby to avoid habituation of said termites to its presence.

13. The method of claim 10, wherein termite residence time during which the termites remain in the building after commencement of ozone delivery and before they vacate the building and on the basis of which an infusion duration period is established, is determined in advance by tests on said building or a comparable building.

14. The method of claim 10, wherein teimite residence time during which the termites remain in the building after commencement of ozone delivery and before they vacate the building and on the basis of which an infusion duration period is established, is determined in advance by tests in a controlled environment.

15. The method of claim 10, wherein termite deterrence period, during which termites remain away from the building before returning thereto is determined in advance by tests on said building or a comparable building.

16. The method of claim 10, wherein termite deterrence period, during which termites remain away from the building before returning thereto is determined in advance by tests on a controlled environment.

17. A method of protecting a building from damage by termites comprising the steps of:
   preparing an introduction pathway for delivering ozone to a ground region below the building;
   determining, from the physical parameters of the building:
   a) a maximum delivery rate, up to 0.1 ppm, at which ozone can be delivered through said introduction pathway while maintaining a concentration of ozone below a safety threshold in the habitable parts of the building such as to allow continuous uninterrupted occupation by humans;
   b) an infusion duration period for which infusion at said maximum delivery rate will achieve a substantially complete saturation of said region for a time sufficient to affect the behavior of any termites present in said region;
   c) a deterrence period during which termites will be deterred from re-entry into said region by residual pheromones secreted by departing termites; and
   introducing ozone at a rate not greater than said determined maximum delivery rate into said introduction pathway for said determined infusion duration period,
   thereafter discontinuing the introduction of ozone for a discontinuance period not less than said determined deterrence period, then
   recommencing the introduction of ozone at a rate not greater than said determined maximum delivery rate for a further said infusion duration period, and
   repeatedly cycling the periods of infusion and discontinuance for an indefinite period or until it is determined that the risk of termite attack has ceased wherein said infusion and discontinuation periods are of respective irregular durations, whereby to reduce the likelihood of termites becoming resistant or tolerant to the arrangement of the delivery of the ozone.

18. The method of claim 17, wherein the ozone is delivered at a rate such as to create a superatmospheric pressure field in said ground region below the building.

19. The method of claim 17 wherein the ozone concentration is varied below said safety threshold level thereof whereby to avoid habituation of said termites to its presence.

20. The method of claim 17, wherein termite residence time during which the termites remain in the building after the commencement of ozone introduction and before they vacate the building and on the basis of which the infusion duration period is established, is determined in advance by tests on said building or a comparable building.

21. The method of claim 17, wherein termite residence time during which the termites remain in the building after the commencement of ozone introduction and before they vacate the building and on the basis of which the infusion duration period is established, is determined in advance by tests in a controlled environment.

22. The method of claim 17, wherein termite deterrence period, during which termites remain away from the building before returning thereto is determined in advance by tests on said building or a comparable building.

23. The method of claim 17, wherein termite deterrence period, during which termites remain away from the building before returning thereto is determined in advance by tests on a controlled environment.

\* \* \* \* \*